April 17, 1951 T. SARLO 2,549,018
AUTOMOBILE STORAGE COMPARTMENT ACCESSORY
Filed Jan. 17, 1946 2 Sheets-Sheet 1
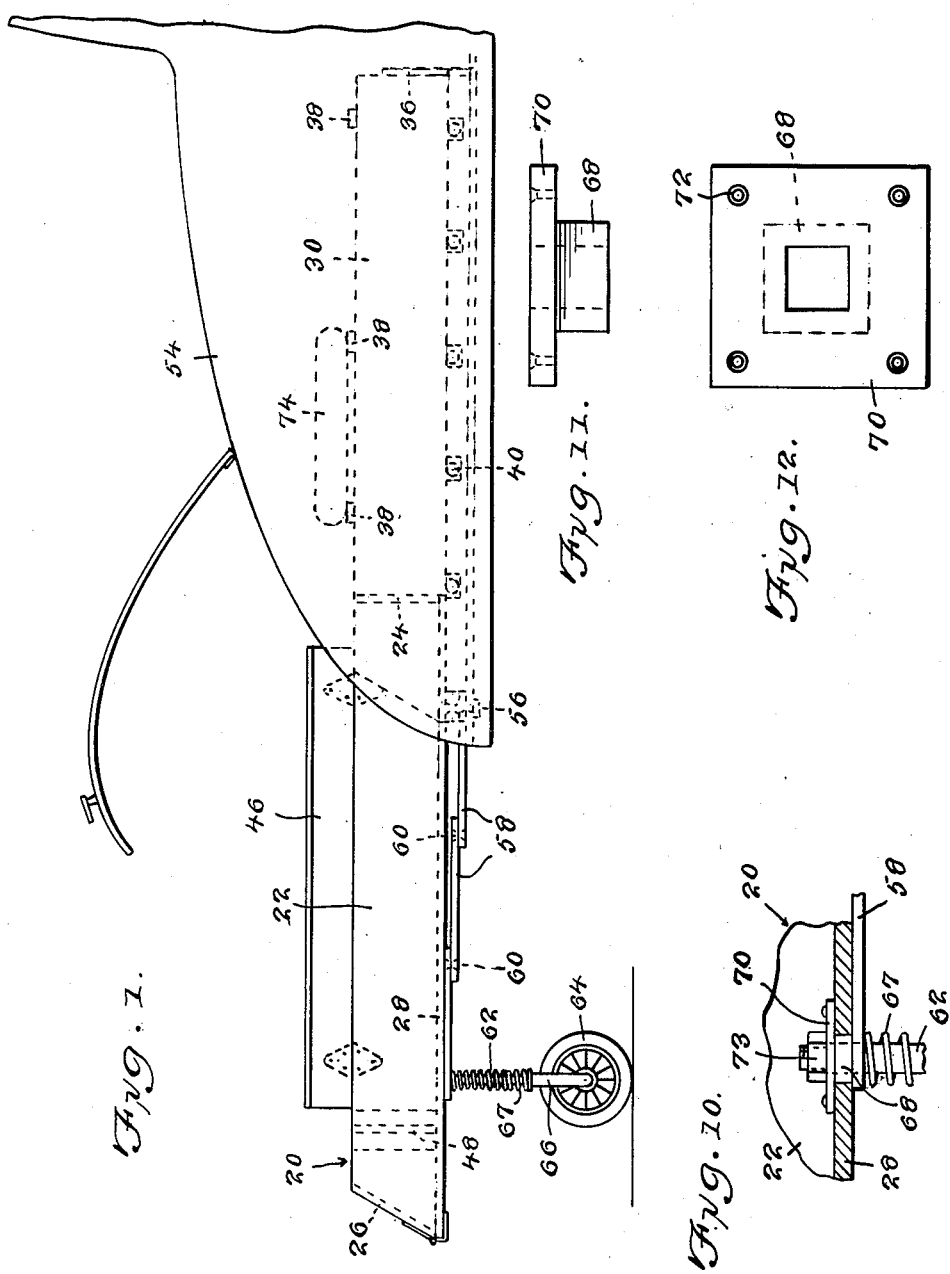
INVENTOR.
Tony Sarlo
BY Victor J. Evans & Co.
ATTORNEYS April 17, 1951 T. SARLO 2,549,018
AUTOMOBILE STORAGE COMPARTMENT ACCESSORY
Filed Jan. 17, 1946 2 Sheets-Sheet 2
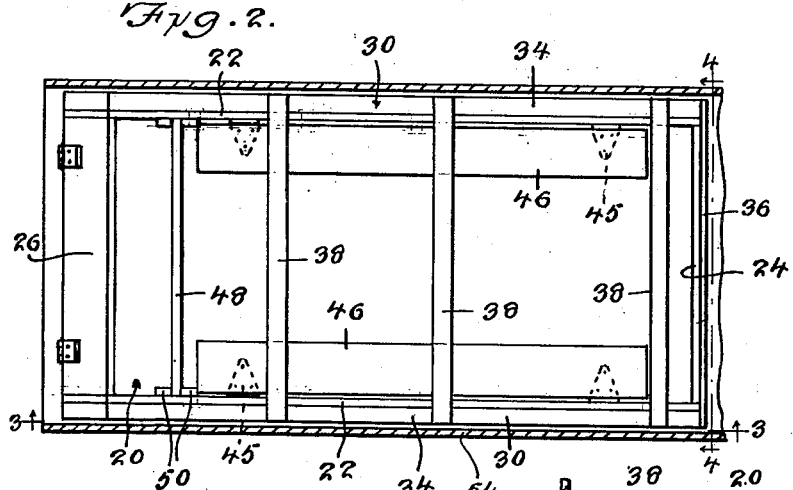
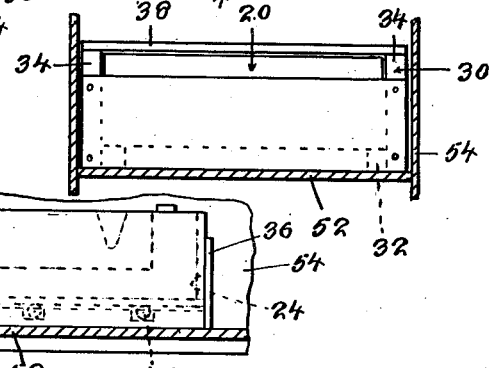
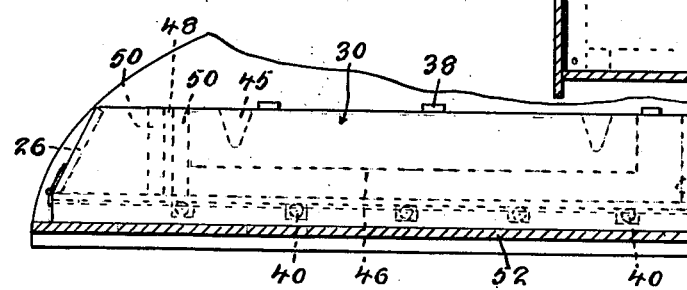
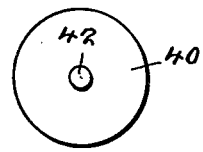
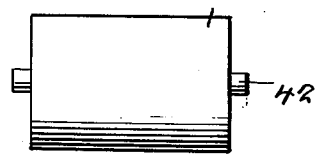
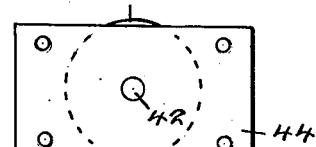
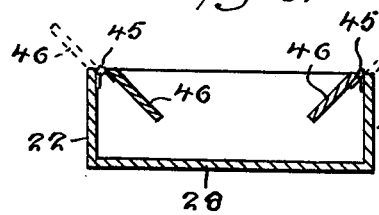
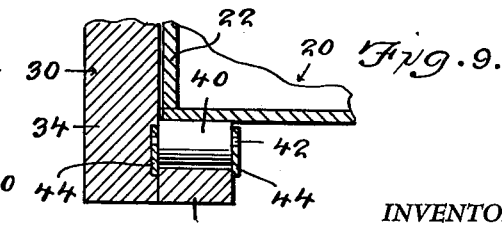
INVENTOR.
Tony Sarlo
BY Victor J. Evans & Co.
ATTORNEYS Patented Apr. 17, 1951

2,549,018

UNITED STATES PATENT OFFICE 2,549,018

AUTOMOBILE STORAGE COMPARTMENT ACCESSORY

Tony Sarlo, Pueblo, Colo.

Application January 17, 1946, Serial No. 641,772

1 Claim. (Cl. 296—26)

This invention relates to an auto-storage accessory and more particularly to a device that can be used in conjunction with a motor vehicle in the manner of a trailer or similar devices.

An object of the invention is to provide a device that when not in use can be completely stored within the rear compartment of an automobile and when in use can be extended therefrom to transport articles too bulky to be received in the body of the vehicle.

Another object of the invention is to provide a device which will not detract from the appearance of the motor vehicle since it is completely hidden from sight when not in use.

With the above and other objects and advantages in view the invention consists of the novel details of construction, arrangement and combination of parts more fully hereinafter described, claimed and illustrated in the accompanying drawings in which:

Figure 1 is a side view of an embodiment of the invention as attached to the rear deck of a motor vehicle.

Figure 2 is a plan view of the device with the vehicle in section.

Figure 3 is a side view thereof.

Figure 4 is a sectional view on the line 4—4 of Figure 2.

Figure 5 is an end view of the roller.

Figure 6 is an elevational view of the roller.

Figure 7 is a view of the plate for mounting the roller.

Figure 8 is a cross sectional view of the body of the device.

Figure 9 is a detailed sectional view of the roller mounting.

Figure 10 is a detailed view of the mounting for the trailer wheel.

Figure 11 is a side view of the mounting and

Figure 12 is a plan view thereof.

Referring more in detail to the drawings the reference numeral 20 designates the body of the device which is rectangular in shape and comprises sides 22 and 24, hinged tail gate 26 and bottom 28.

The body 20 is slidably mounted in a frame 30 comprising longitudinally extending track members 32, sides 34 and 36 and transverse members 38.

Rollers 40 having stub axles 42 journalled in bearing plates 44 are positioned in the members 32 to facilitate sliding movement of the body 20.

Secured to the sides 22 of the body 20 by means of hinges 45 are side boards 46 which can be raised as shown in Figure 7 to increase the carrying capacity of the body 20.

A movable partition 48 mounted in guide members 50 is mounted adjacent the tail gate 26 and provides a tool box.

As shown in Figure 3 the frame 30 is mounted on the floor 52 of the rear compartment 54 of the vehicle and the body can be easily moved into and out of the compartment 54 as shown in Figure 1.

Secured to one of the transverse members 38 on the lower end of the frame 30 by a bolt 56 are a plurality of links 58 which are pivoted to each other by pins 60. These links are foldable and will lie in parallel relationship with each other when the body 20 is slid into the compartment 54.

These links are used to position the body 20 in extended position outwardly of the compartment 54 and the rearmost link 58 is connected to the shaft 62 of the trailer wheel 64 mounted in the fork 66 at the lower end of the shaft 62 and a coil spring 67 mounted on the shaft 62 intermediate the fork 66 and one of the links 58 cushions the body when loaded.

The shaft is mounted in the bearing 68 having the flange 70 provided with apertures 72 whereby the bearing is secured to the bottom 28 of the body 20. This trailer wheel prevents the body from inclining downwardly when a load is carried therein. The wheel is removable and can be carried in the compartment when not in use. The nut 73 being the means for retaining the wheel in operational position as shown in Figure 10.

As shown in Figure 1 the tire 74 of the vehicle shown in dotted lines is positioned on the transverse members 38 of the frame 30.

It will also be noticed that the sides of the body are inclined at their outer ends to permit closing of the turtle back of the rear compartment of the vehicle.

Thus a device has been provided that can be moved into and out of the rear compartment of the vehicle to increase the carrying capacity thereof and is provided with a trailer wheel to prevent overbalancing of the vehicle when the carrier is loaded.

It is believed that the operation and construction of the device will be apparent to those skilled in the art and that it is to be understood that changes may be made in the details of construction, arrangement and combination of parts without departing from the spirit of the invention or the scope of the appended claim.

Having thus described the invention what is claimed as new and desired to be secured by Letters Patent is:

A device of the character described in combination with a motor vehicle having a rear storage compartment therein comprising a rectangular shaped frame having longitudinally extending track members that is adapted to be mounted in the rear storage compartment of the vehicle, relatively spaced rollers journalled in said track members, a rectangular shaped body adapted to slidably engage the rollers in the track ways so that when in load carrying position said body is extended beyond the confines of the compartment and when in nonload carrying position said body is entirely received into said compartment, a bearing mounted at the rear end of the body, a plurality of links pivoted together end to end pivotally mounted at the lower rear end of the frame by one end of the forward link of said links, the end of the rearmost link having an opening therein to receive the shaft of a trailer wheel so that when said links are fully extended and the shaft has been received in the bearing mounted at the rear end of the body, said links will position said body in load carrying position outwardly of said frame and said trailer wheel is adapted to support the rear end of the body when in load carrying position.

TONY SARLO.

REFERENCES CITED

The following references are of record in the file of this patent:

UNITED STATES PATENTS

| Number | Name | Date |
|---|---|---|
| Re. 20,292 | Brown | Mar. 16, 1937 |
| 1,209,577 | Heath | Dec. 19, 1916 |
| 1,366,771 | Devencenzi | Jan. 25, 1921 |
| 2,091,076 | Langdon | Aug. 24, 1937 |
| 2,110,944 | Schultz | Mar. 15, 1938 |
| 2,133,902 | Patrick | Oct. 18, 1938 |
| 2,172,405 | Powell | Sept. 12, 1939 |
| 2,211,083 | Smith | Aug. 13, 1940 |
| 2,254,437 | Marney | Sept. 2, 1941 |
| 2,284,419 | Greig | May 26, 1942 |
| 2,328,138 | Gosser | Aug. 31, 1943 |

FOREIGN PATENTS

| Number | Country | Date |
|---|---|---|
| 559,485 | Great Britain | Feb. 22, 1944 |